(12) United States Patent
Schlager

(10) Patent No.: US 6,600,618 B2
(45) Date of Patent: Jul. 29, 2003

(54) TIME DOMAIN VOICE COIL MOTOR CONTROL CIRCUIT AND METHOD

(75) Inventor: Karl Michael Schlager, Campbell, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/159,072

(22) Filed: Sep. 21, 1998

(65) Prior Publication Data

US 2002/0141098 A1 Oct. 3, 2002

(51) Int. Cl.$^7$ .................. G11B 21/02; G11B 5/596
(52) U.S. Cl. .................. 360/75; 360/78.04; 318/560
(58) Field of Search ................ 360/75, 78.06, 360/78.04, 250, 254, 254.2, 255.1, 254.7, 255.6, 260, 264, 264.1, 266.2; 318/560

(56) References Cited

U.S. PATENT DOCUMENTS

| | | | |
|---|---|---|---|
| 4,491,776 A | 1/1985 | Veale | 318/516 |
| 4,864,437 A | 9/1989 | Couse et al. | 360/75 |
| 4,967,291 A | * 10/1990 | Touchton et al. | 360/78.04 |
| 5,221,881 A | 6/1993 | Cameron | 318/254 |
| 5,285,135 A | 2/1994 | Carbolante et al. | 318/254 |
| 5,297,024 A | 3/1994 | Carobolante | 360/67 |
| 5,325,030 A | * 6/1994 | Yamamura et al. | 360/75 |
| 5,566,369 A | 10/1996 | Carobolante | 360/75 |
| 5,615,064 A | 3/1997 | Blank et al. | 360/75 |
| 5,831,786 A | 11/1998 | Boutaghou et al. | 360/75 |
| 6,081,112 A | 6/2000 | Carobolante et al. | 324/177 |
| 6,373,650 B1 | 4/2002 | Pedrazzini | 360/75 |

FOREIGN PATENT DOCUMENTS

| | | |
|---|---|---|
| EP | 0 667 615 A1 | 8/1965 |
| EP | 0 919 992 A1 | 6/1999 |
| JP | 61 150687 | 7/1986 |
| JP | 63 274386 | 11/1988 |
| WO | WO 00/36604 | 6/2000 |

OTHER PUBLICATIONS

Pedrazzini, "IBM Hard Disk Drive Load/Unload Technology," *Computer Data Storage Newsletter*, Jul. 1997, vol. 10(7), Issue No. 114, p. 12.

* cited by examiner

*Primary Examiner*—Andrew L. Sniezek
(74) *Attorney, Agent, or Firm*—David V. Carlson; Lisa K. Jorgenson

(57) ABSTRACT

An embodiment of the present invention includes a method for driving a voice coil motor in response to signals from a feedback network that senses voice coil motor velocity. The method includes steps of providing a drive signal to an H-bridge for a first interval. At the end of the first interval, the H-bridge is placed in a high impedance state. Following a pause for a second interval during which transient voltages extinguish, a sample and hold circuit is coupled to the voice coil motor. The sample and hold circuit measures a voltage from the voice coil motor that is directly proportional to voice coil motor velocity and thus is directly related to head velocity. After the sample and hold circuit measures the voice coil motor voltage, the input to the sample and hold circuit is disabled. An output signal from the sample and hold circuit is coupled to the feedback network and thus to the H-bridge. As a result, voice coil motor and head velocity is more accurately controlled, reducing probability of collision between heads and discs in a disc drive and thereby increasing reliability of the disc drive.

16 Claims, 4 Drawing Sheets

TIME DOMAIN VOICE COIL MOTOR CONTROL CIRCUIT AND METHOD

TECHNICAL FIELD

This invention relates to improvements in electronic circuitry used in moving read/write heads in a memory disc system for use with computers, and, more particularly, to improvements in such circuitry for providing drive signals to a voice coil motor for such a system.

BACKGROUND OF THE INVENTION

Voice-coil motors are linear actuators that are widely used for moving heads and their support assemblies across discs in computer system disc drives in order to read data from or write data to the disc and in activating or deactivating disc drives. The heads float across the disc surface on a cushion of air resulting from rotation of the discs. In a conventional disc drive, the disc is roughened on at least portions of the disc surface to obviate sticking of the head to the disc surface as the disc is spun from a stop to an operating speed.

As data densities on the discs have increased, need for greater precision and accuracy in head positioning has also increased. Additionally, spacings between the heads and the discs have decreased to a point where roughening of the disc surface is impractical. As a result of these changes, a prior art practice of "parking" the head in the innermost data track in an area removed from areas of the disc that store data no longer provides adequate safeguarding of the head or of the disc when the computer system is not in use and particularly when the head is deployed from the parked position.

In increasing numbers of disc drives, the head is parked by causing the head support assembly to traverse a ramp to remove the head from proximity to the disc when the disc drive is deactivated as the system is shut down. When the head support assembly reaches the end of the ramp, the head support assembly is latched into a storage position. The head then cannot collide with the disc if the disc drive is jarred or bumped, avoiding one potential source of damage to the head or to the disc.

As the system is reactivated, the head is unparked by releasing the head support assembly from the latch. The head support assembly then traverses the ramp towards the disc in response to signals delivered to the voice coil motor from a controller. The head must be moving with the correct speed when the head support assembly reaches the end of the ramp in order to maintain the head in proximity to the disc without collision between the head and the disc. As a result, the controller must provide the proper drive signals to the voice coil motor resulting in the correct speed for the head when the head support assembly exits the ramp.

One method for driving the voice coil motor is to apply a constant voltage to a voice coil in the voice coil motor. However, the voice coil motor generates a back electromotive force (BEMF) because the voice coil is moving in a magnetic field. The actual voltage driving the voice coil motor thus is the sum of the resistive voltage (I.R.) and the BEMF, which varies with voice coil motor velocity $V_M$. As a result, the applied voltage is not the actual BEMF of the voice coil motor.

Some conventional voice coil motor controller circuits employ a digital to analog converter circuit for providing analog control signals to the voice coil motor controller in response to digitally preprogrammed profiles. However, these conventional controller circuits have limited ability to compensate for wearing of the ramp and of the portions of the head supporting assembly that are in contact with the ramp. Additionally, conventional controller circuits have limited capability for providing control signals responsive to head velocity variations originating from other sources, such as motion of the disc drive.

In prior art approaches to driving voice coil motors and compensating for the BEMF, as described in U.S. Pat. Nos. 5,566,369 and 5,297,024, both issued to F. Carobolante, a current sensing resistor is coupled in series with the voice coil motor. A differential buffer amplifier has inputs coupled to the terminals of the current sensing resistor and provides an output signal that is proportional to a current through the voice coil motor. A comparison circuit then allows the current through the voice coil motor to be corrected to a desired value. However, the effective resistance of the voice coil motor causes some of the energy from the current through the voice coil motor to be lost as heat. As a result, this form of feedback, while providing improved performance for the voice coil motor, does not result in optimal performance, especially as voice coil motor characteristics change with age, temperature and the like.

SUMMARY OF THE INVENTION

In several aspects, the present invention includes circuits and methods for providing feedback from the motion of a head to a voice coil motor controller circuit to correct head velocity during ramp loading of the head from a disc into a storage position and particularly during ramp unloading from the storage position into proximity to the disc. As a result, voice coil motor velocity may be monitored and corrected to compensate for temperature-induced mechanical changes and also for wear of moving components that are in contact with other components.

In one aspect, the present invention includes a power supply circuit coupled to the voice coil motor that in turn is coupled to the head. A controller provides signals to the voice coil motor to correct voice coil motor velocity in response to signals from a feedback network. The feedback network includes a sample and hold circuit that is coupled to the voice coil motor during intervals when the power supply circuit is not providing drive signals to the voice coil motor.

In another aspect, the present invention includes a method for driving a voice coil motor in response to signals from a feedback network that senses voice coil motor velocity. The method includes steps of providing a drive signal to an H-bridge for a first interval. At the end of the first interval, the H-bridge is placed in a high impedance state. Following a pause during a second interval while transient voltages extinguish, a sample and hold circuit is coupled to the voice coil motor. The sample and hold circuit measures a voltage from the voice coil motor that is directly proportional to voice coil motor velocity and thus is directly related to head velocity. After the sample and hold circuit measures the voice coil motor voltage, the input to the sample and hold circuit is disabled. An output signal from the sample and hold circuit is coupled to the feedback network and thus to the H-bridge. As a result, head velocity is more accurately controlled, reducing probability of collision between the heads and the discs and thereby increasing reliability of the disc drive.

DETAILED DESCRIPTION OF THE INVENTION

Figure 1:
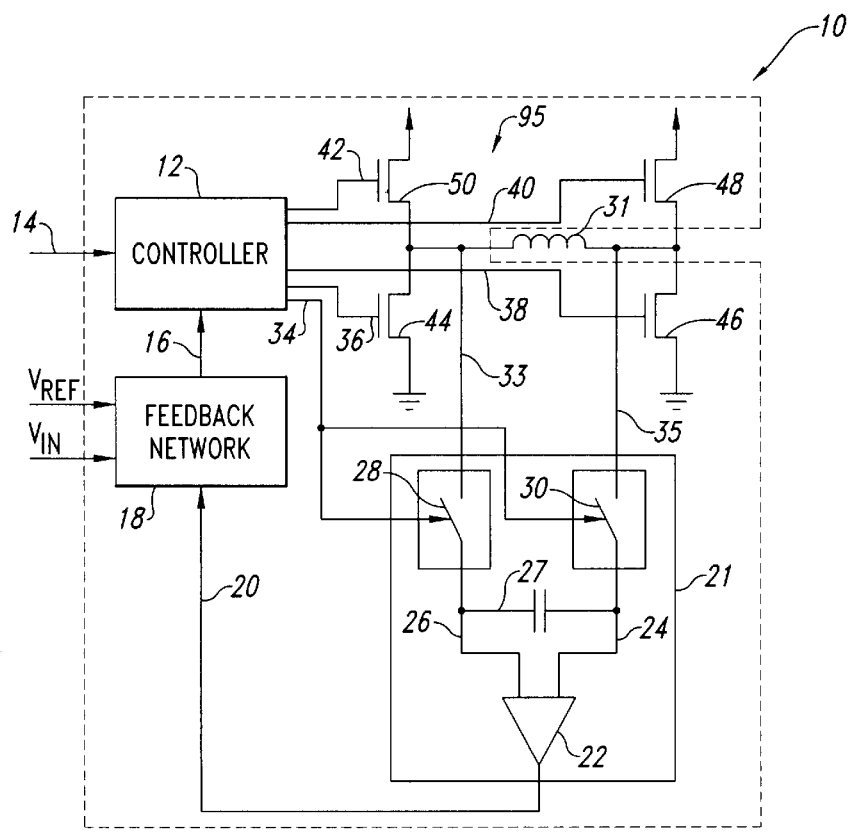
FIG. 1 is a simplified block diagram of a voice coil motor driving circuit, in accordance with embodiments of the present invention.

FIG. 1 is a simplified block diagram of a voice coil motor driving circuit 10, in accordance with embodiments of the present invention. The driving circuit 10 includes a controller 12 having a first input 14 coupled to a computer system and a second input 16 coupled to an output of a feedback network 18.

The feedback network 18 has an input 20 coupled to the output of a sample and hold circuit 21.

The sample and hold circuit 21 includes a high input impedance amplifier 22 having a first input 24 and a second input 26. In one embodiment, the high input impedance amplifier may be a FET input operational amplifier 22. A capacitor 27 is coupled across the first 24 and second 26 inputs. Switches 28 and 30, which may be solid state switches such as pass gates or FET switches, or other devices that act to couple or decouple a voice coil 31 from the capacitor 27 in response to sampling signals from an output 34 of the controller 12. In one embodiment, the switches 28 and 30 are formed from a pair of isolation FETs in the sample and hold circuit 21.

Outputs 34, 36, 38, 40 and 42 of the controller 12 are coupled to a power supply circuit 95. A preferred power supply circuit 95 includes FETs 44, 46, 48 and 50 having their respective outputs coupled via lines 33, 35 to the voice coil 31 and that are coupled in a conventional "H-bridge" configuration. The transistors are all N-channel type in one design or, if desired, transistors 48 and 50 are P-channel in an alternative design. In one embodiment, the FETs 44, 46, 48 and 50 are constructed such that they could be modeled as an FET having an integral diode with an anode coupled so a source of the FET and having a cathode coupled to a drain of the FET. As a result, signals on the lines 33 and 35 cannot have voltage excursions greater than one forward-biased diode voltage above the power supply voltage or below ground. In one embodiment, the controller 12 provides analog control signals to pairs 44, 48 or 46, 50 of the FETs to provide current to the voice coil 31 to drive the head (shown in FIG. 3) in a first or a second direction, or turn OFF all of the FETs 40, 44, 48 and 50 to decouple external power sources from the terminals of the voice coil 31.

It will be appreciated that other arrangements may be used to implement the connection to sample and hold circuit 21. For example, the controller 12 could cause one side of the other of the voice coil 31 to be grounded through the transistor 44 or 46, with another side of the voice coil 31 being coupled to one side of the capacitor 27 and the other side of the capacitor 27 being coupled to ground. In this embodiment, the amplifier 22 may be implemented as a one-sided voltage follower, e.g., an operational amplifier 22 configured to provide, for example, unity gain.

Figure 2:
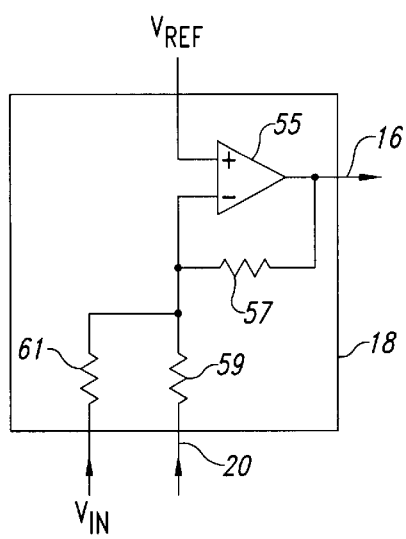
FIG. 2 is a simplified schematic diagram of the feedback network of FIG. 1, in accordance with embodiments of the present invention.

FIG. 2 is a simplified schematic diagram of the feedback network 18 of FIG. 1, in accordance with embodiments of the present invention. A feedback signal at the input 20 is added to an analog control signal $V_{IN}$ and the resulting voltage is then compared to a reference voltage $V_{REF}$ by an amplifier 55 having a gain $A_E$ that is set by a ratio of resistors 57 and 59. As a result, when the comparison between the voltage $V_{REF}$ and the sum of $V_{IN}$ and the output voltage from the sample and hold circuit 21 indicates that the heads are moving too slowly, a larger drive signal is generated by the controller 12 in response to the output signal from the feedback network 18 in order to speed the voice coil motor up. Conversely, when the comparison between the voltage $V_{REF}$ and the sum of $V_{IN}$ and the output voltage from the sample and hold circuit 21 indicates that the head is moving too fast, a reduced drive signal is generated by the controller 12 in response to the output signal from the feedback network 18 in order to slow the voice coil motor down. An output signal from the amplifier 55 is then applied to the input 16 to the controller 12.

Conventional voice coil motor controller circuits employ a digital to analog converter circuit (not shown) that outputs an analog control signal $V_{IN}$ in response to digitally preprogrammed profiles. However, these voice coil motor controller circuits have limited ability to compensate for effects due to wearing of the ramp and of those portions of the head supporting assembly that are in contact with the ramp. Additionally, the feedback provided by the driving circuit 10 does not compensate for voltage errors in the voltage actually present in the voice coil 31 that result from a dc resistance $R_{MOTOR}$ of the voice coil 31.

In one embodiment, the sample and hold circuit 21, the feedback network 18 and the controller 12 are integrated into a single integrated circuit. The capacitor 27 may be external to the integrated circuit. In one embodiment, the H-bridge is also external to the integrated circuit. while in another embodiment, the FETs 44–50 in the H-bridge are included in the integrated circuit. The integrated circuit may be formed using known processes, such as full CMOS or BiCMOS that combines complementary metal-oxide-semiconductor transistors with bipolar transistors.

Figure 3:
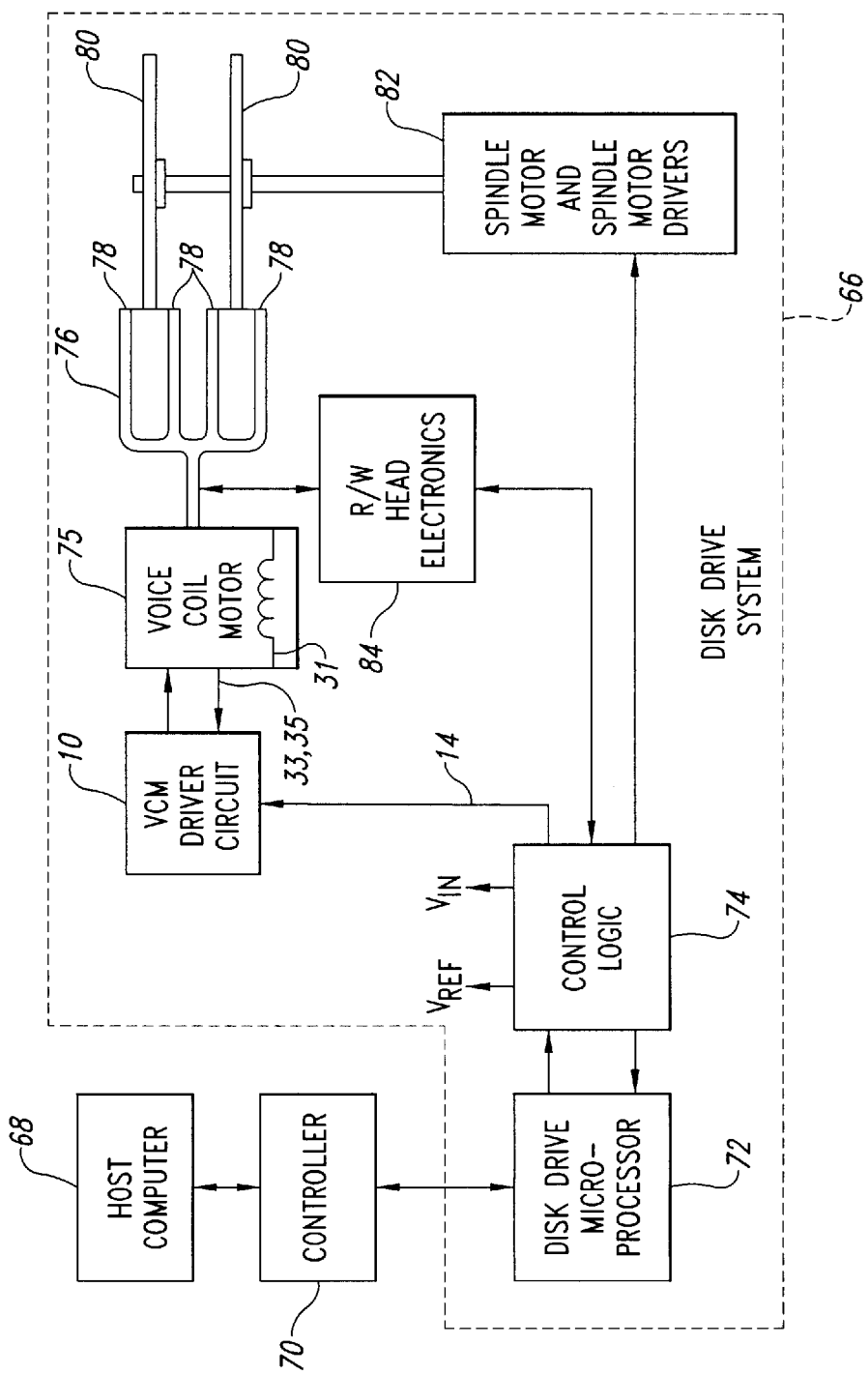
FIG. 3 is a simplified block diagram of a disc drive, in accordance with embodiments of the present invention.

FIG. 3 is a simplified block diagram of a disc drive 66, in accordance with embodiments of the present invention. The disc drive 66 is coupled to a host computer 68 through a controller 70 that provides instructions to a disc drive microprocessor 72. The disc drive microprocessor 72, in turn, provides commands to control logic 74, which decodes the commands into control signals. Some of these control signals are coupled to the voice coil motor drivers 10. A voice coil motor 75 that includes the voice coil 31 of FIG. 1 moves in response to the control signals, causing a head support system 76 to move heads 78 across discs 80, or to park or unpark the heads 78. A spindle motor and spindle motor drive circuit 82 cause the discs 80 to rotate in response to control signals from the control logic 74. Read/write head electronics 84 are also responsive to control signals from the control logic 74. The read/write head electronics 84 deliver read data from the discs 80 to the control logic 74 to read data from the discs 80 and write data from the control logic 74 to the heads 78 to write data to the discs 80.

Figure 4:
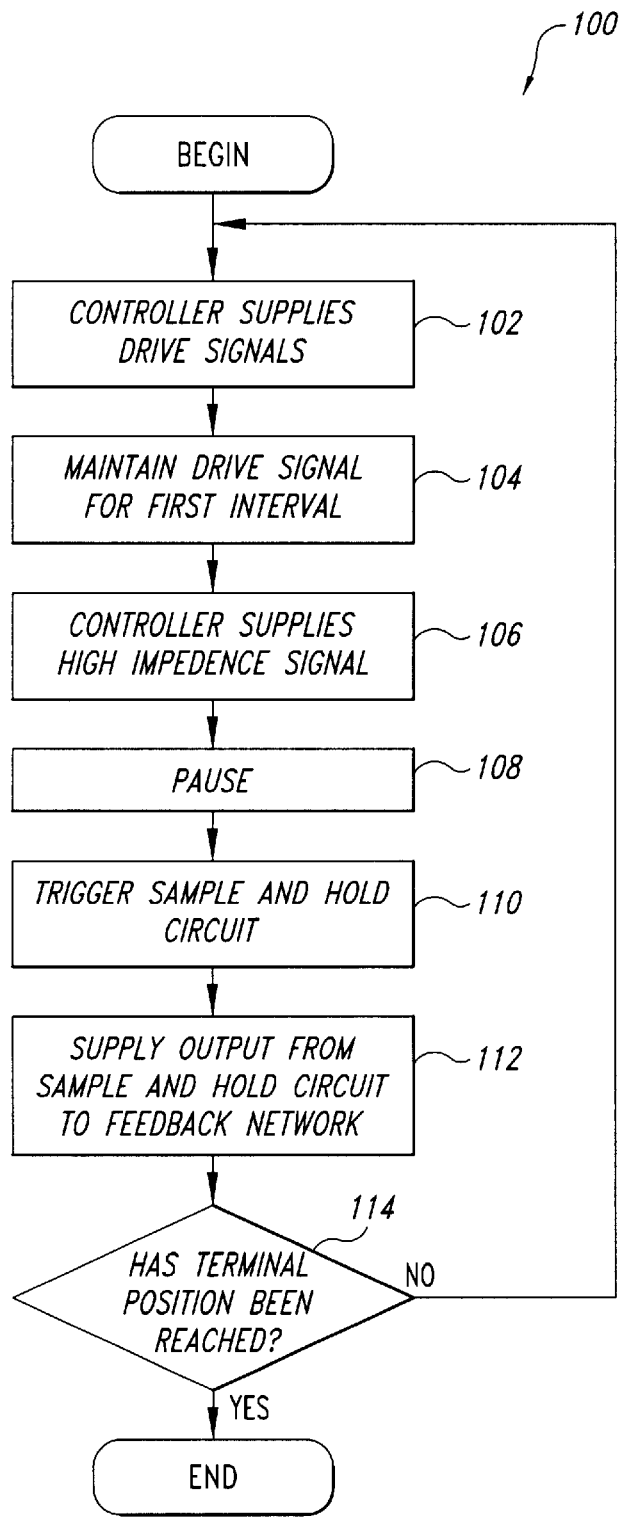
FIG. 4 is a simplified flow chart of a process for inactivating and activating a head for a disc drive, in accordance with embodiments of the present invention.
Figure 5:
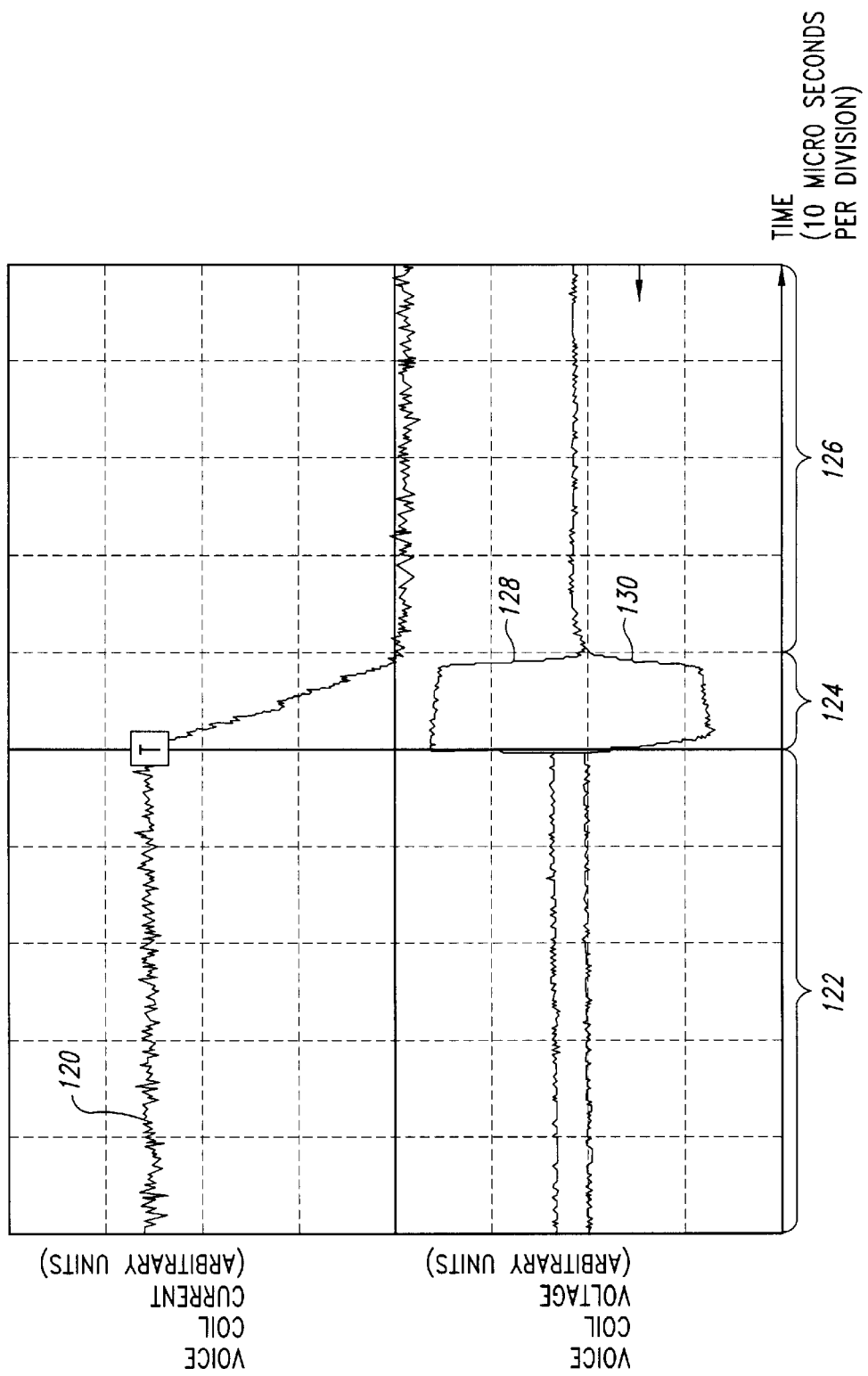
FIG. 5 is a graph showing voice coil motor current (top trace) and voltage (bottom trace) during the process of FIG. 4, in accordance with embodiments of the present invention.

FIG. 4 is a simplified flow chart of a process 100 for inactivating and parking, or activating and unparking, the heads 78 of FIG. 3 for the disc drive 66, and FIG. 5 is a graph showing voice coil 31 (FIG. 1) current 120 (top trace) and voltage 128 or 130 (bottom trace) during the process 100 of FIG. 4, in accordance with embodiments of the present invention. In a step 102, the voice coil motor driving circuit 10 of FIGS. 1 and 3 supplies drive signals to one of the pairs of FETs 44, 48 or 46, 50 to move and park the heads 78 of FIG. 3 when the disc drive 66 is to be deactivated as part of a normal system shutdown, or to move and unpark the heads 78 when the system is to be reactivated as part of a normal system boot operation. In a step 104, the drive signals from the voice coil motor driving circuit 10 are maintained during a first interval having a first predetermined length. In one embodiment, the first predetermined length is about one millisecond, although longer or shorter intervals may be used. The top trace 120 of FIG. 5 has a first segment 122 corresponding to a portion of the drive signal of the step 102 during the inferral of the step 104.

In a step 106, the voice coil motor driving circuit 10 supplies a control signal to set all of the FETs 44, 46, 48 and 50 of FIG. 1 to a high impedance condition, i.e., turns OFF all of the FETs 44, 46, 48 and 50, at a time corresponding to the end of the first segment 122 and the beginning of a second segment 124 of FIG. 5. This creates an open circuit on both ends of the voice coil 31. In one embodiment, the current formerly passing through the inductive voice coil 31 is shunted through the integral diodes in the FETs 44, 46, 48 and 50, causing the voltage to be clamped to the power supply or ground, as shown in FIG. 5. During the second segment 124, the voice coil 31 of FIG. 1 exhibits a voltage (lower trace, FIG. 5) 128 or 130 given by Ldi/dt, where L represents an inductance of the voice coil 31 and di/dt represents the change in current through the voice coil 31 per unit time.

In a step 108, the process 100 pauses for a second interval lasting for a second predetermined length that is longer than the length of the second segment 124 of FIG. 5 in order to allow the Ldi/dt voltage 128 or 130 during the second segment 124 to extinguish. In a step 110, during a time represented in part by a segment 126 of the top trace of FIG. 5, the process 100 triggers the sample and hold circuit 21 of FIG. 1 to measure the BEMF across the voice coil 31 of the voice coil motor 75 of FIG. 3. The BEMF is directly related to the velocity of the voice coil motor 75 because it is due to relative motion of the voice coil 31 and a magnet (not shown) in the voice coil motor 75. The BEMF is equal to $K_e V_M$, where $K_e$ is readily calculated. The segments 124 and 126 together represent a pause of between 50 and 200 microseconds, although longer or shorter intervals could be used, depending on the inductance L of the voice coil 31 in the voice coil motor 75, parasitic resistance $R_{MOTOR}$ in the voice coil 31, friction and other factors. During the segments 124 and 126, the head 78 continues to move. Therefore, the BEMF generated by the motion of the head 78 can be used to calculate the velocity $V_M$ of the voice coil motor 75. In one embodiment, the voice coil motor driving circuit 10 includes nonvolatile memory (not shown) coupled to the disc drive microprocessor 72 for storing delay parameters for different voice coils 31 employed in different disc drives 66.

In a step 112, an output signal from the sample and hold circuit 21 is supplied to the feedback network 18 of FIGS. 1 and 2. In a query task 114, the process 100 determines if the heads 78 (FIG. 3) have reached a terminal position, either latched and parked, or unparked and deployed on the disc 80. When the query task 114 determines that the heads 78 have not yet reached a terminal position, control passes back to the step 102 and a revised drive signal incorporating feedback from the feedback network 18 is sent to the FETs 44, 48 or 46, 50. The steps 102–114 iterate until the query task 114 determines that the heads 78 have reached a terminal position, i.e., are either parked or unparked. Typically, this iteration has a periodicity of between 800 microseconds and two milliseconds. When the query task 114 determines that the heads 78 have reached a terminal position, the process 100 ends.

Disc drives 66 including the head unparking and control circuitry for such applications may provide significant advantages over other types of disc drives, including reduced head and disc wear and increased data storage density leading to increased storage capacity. The present invention also allows increased overall disc drive reliability due to reduced probability of collision between the heads and the disc. The circuits of the present invention may be implemented in an integrated circuit, with the improvements of the present invention resulting in very little additional silicon area being needed. The methods and apparatus of the present invention compensate for effects of wear in head deployment apparatus. Programmable delays may allow a variety of different types of disc drives to be improved with a single integrated circuit. Disc drives find application in most computers where, for example, operating systems as well as programs and data are stored and may be modified.

Improved disc head parking and unparking control circuits and methods have been described. Although the present invention has been described with reference to specific embodiments, the invention is not limited to these embodiments. Rather, the invention is limited only by the appended claims, which include within their scope all equivalent devices or methods which operate according to the principles of the invention as described.

What is claimed is:

1. A disc drive comprising:
   a disc including a data storage medium;
   a motor coupled to the disc and causing the disc to rotate in response to control signals;
   a head suspended near the disc and reading data from the data storage medium in response to control signals;
   a voice coil motor having windings coupled to the head and moving the head across the disc in a first mode of operation and moving the head to and from a storage location near the disc in a second mode of operation; and
   a voice coil motor driving circuit coupled to the voice coil motor and providing control signals to the voice coil motor, the voice coil motor driving circuit including:
   a power supply circuit including an H-bridge, having outputs coupled to the voice coil motor windings;
   a controller having outputs coupled to inputs of the power supply circuit, the controller providing drive signals to the power supply circuit during a first interval and setting the output of the H-bridge to a high impedance state during a second interval;
   a sample and hold circuit including inputs selectively couplable to the voice coil motor windings in response to sampling signals from the controller during the second interval; and
   a feedback network having an input coupled to the sample and hold circuit and an output coupled to an input of the controller.

2. The disc drive of claim 1 wherein the sample and hold circuit further comprises:
   a first switch having a first terminal coupled to one terminal of the voice coil motor and including a control terminal coupled to the controller;
   a second switch having a first terminal coupled to another terminal of the voice coil motor and including a control terminal coupled to the controller;
   a capacitor coupled between a second terminal of the first switch and a second terminal of the second switch, the first and second switches coupling and uncoupling the capacitor to the voice coil motor in response to the sampling signals; and a high input impedance amplifier having a first input coupled to the first terminal of the capacitor, a second input coupled to the second terminal of the capacitor and an output coupled to the output of the sample and hold circuit.

3. The disc drive of claim 1 wherein the feedback network includes:

a second input coupled to an output of the controller; and an operational amplifier including an inverting input and a noninverting input, the inverting input coupled to the first input of the feedback network through a first resistor, the second input of the feedback network through a second resistor, the noninverting input coupled to a reference voltage source, the operational amplifier having an output coupled to the feedback network output.

4. The disc drive of claim 1 wherein the controller, the feedback network and the sample and hold circuit comprise a single integrated circuit.

5. The disc drive of claim 1 wherein the controller further includes a programmable delay between initiation of the second interval and the sampling signals.

6. The disc drive of claim 1 wherein the controller provides a delay lasting between fifty microseconds and two hundred microseconds between initiation of the second interval and the sampling signals.

7. The disc drive of claim 1 wherein the controller iterates providing drive signals to the power supply circuit, setting the output of the power supply to the high impedance state during the second interval and providing sampling signals with a periodicity of between 800 milliseconds and two milliseconds until a terminal position is reached by the heads.

8. An apparatus for providing control signals to a power supply circuit that is coupled to a voice coil motor, having windings comprising:

a controller having outputs coupled to inputs of a power supply circuit, the controller being coupled for providing drive signals to the power supply circuit during a first interval and for setting the power supply circuit to a high impedance state during a second interval;

a sample and hold circuit including inputs selectively couplable to the voice coil motor windings in response to sampling signals from the controller during the second interval; and a feedback network having an input coupled to an output of the sample and hold circuit and an output coupled to an input to the controller.

9. The apparatus of claim 8 wherein the feedback network includes:

a second input coupled to an output of the controller; and an operational amplifier including an inverting input and a noninverting input, the inverting input coupled to the first input of the feedback network through a first resistor, the second input of the feedback network through a second resistor, the noninverting input coupled to a reference voltage source, the operational amplifier including an output coupled to the feedback network output; and a third feedback resistor connecting the output of the operational amplifier to the inverting input.

10. The apparatus of claim 8 wherein the sample and hold circuit further comprises:

a first switch including a first terminal coupled to one terminal of the voice coil motor and including a control terminal coupled to the controller;

a second switch including a first terminal coupled to another terminal of the voice coil motor and including a control terminal coupled to the controller;

a capacitor coupled between a second terminal of the first switch and a second terminal of the second switch, the first and second switches coupling and uncoupling the capacitor to the voice coil motor in response to the sampling signals; and a high input impedance amplifier including a first input coupled to the second terminal of the first switch, a second input coupled to the second terminal of the second switch and including an output coupled to the output of the sample and hold circuit.

11. The apparatus of claim 8 wherein the controller, the feedback network and the sample and hold circuit comprise an integrated circuit.

12. The apparatus of claim 8 wherein the controller further includes a programmable delay between initiation of the second interval and the sampling signals.

13. The apparatus of claim 8 wherein the controller provides a delay lasting between fifty microseconds and two hundred microseconds between initiation of the second interval and the sampling signals.

14. A method for controlling head loading and unloading comprising:

entering a head loading or unloading mode of operation;

providing a drive signal from an output of an H-bridge to a voice coil motor having windings for a first interval having a first predetermined length;

placing the output to the H-bridge in an off state for a second interval having a second predetermined length at a conclusion of the first interval;

coupling a sample and hold circuit to the voice coil motor windings to sample a voltage from the voice coil motor windings after initiation of the second interval; and coupling an output signal from the sample and hold circuit to the H-bridge, wherein coupling a sample and hold circuit to the voice coil motor windings comprises:

turning ON a first FET coupled between a first terminal of the voice coil motor windings and a first terminal of a capacitor; and turning ON a second FET coupled between a second terminal of the voice coil motor windings and a second terminal of the capacitor.

15. A method for controlling head loading and unloading comprising:

entering a head loading or unloading mode of operation;

providing a drive signal from an output of a H-bridge to a voice coil motor having windings for a first interval having a first predetermined length;

placing the output to the H-bridge in an off state for a second interval having a second predetermined length at a conclusion of the first interval;

sampling a voltage from the voice coil motor windings during the second interval while the H-bridge circuit is in an off state; and repeating the steps of providing a drive signal, placing the output to the H-bridge in a high impedance state, and coupling a sample and hold circuit to the voice coil motor until the head reaches a terminal position with a periodicity of between 800 microseconds and two milliseconds.

16. An apparatus for providing control signals to a power supply circuit that is coupled to a voice coil motor, having windings comprising:

a controller having outputs coupled to inputs of a power supply circuit, the controller being coupled for providing drive signals to the power supply circuit during a first interval and for setting the power supply circuit to an off state during a second interval;

a sample circuit including inputs selectively couplable to the voice coil motor in response to sampling signals from the controller during the second interval; and a feedback network having an input coupled to an output of the sample and hold circuit and an output coupled to an input to the controller.

* * * * *